United States Patent [19]

McGeehins

[11] Patent Number: 4,763,790

[45] Date of Patent: Aug. 16, 1988

[54] HEAT TREATABLE CONTAINERS

[75] Inventor: Robert McGeehins, Leeds, England

[73] Assignee: Waddingtons Cartons Limited, England

[21] Appl. No.: 86,399

[22] Filed: Aug. 14, 1987

[30] Foreign Application Priority Data

Aug. 30, 1986 [GB] United Kingdom ............... 8621009

[51] Int. Cl.⁴ ............................................. B65D 81/34
[52] U.S. Cl. ..................................... 206/557; 99/449;
    206/525; 219/10.55 E; 426/107; 426/113
[58] Field of Search .................. 206/525, 557; 99/449,
    99/451; 219/10.55 E; 426/107, 113, 114, 394

[56] References Cited

U.S. PATENT DOCUMENTS

| 4,351,997 | 9/1982 | Mattisson et al. | 426/107 |
| 4,425,368 | 10/1984 | Watkins | 206/525 |
| 4,574,174 | 3/1986 | McGonigle | 426/113 |
| 4,641,005 | 2/1987 | Seiferth | 219/10.55 E |
| 4,644,858 | 2/1987 | Liotto et al. | 219/10.55 E |
| 4,661,672 | 4/1987 | Nakanaga | 219/10.55 E |

Primary Examiner—Jimmy G. Foster
Attorney, Agent, or Firm—Klauber & Jackson

[57] ABSTRACT

The invention provides that a microwavable tray is provided with a skirt which covers those areas of the tray subjected to heat radiation when the tray is placed under a grill for the grilling of the tray products, said skirt being of a heat reflective material.

7 Claims, 2 Drawing Sheets

HEAT TREATABLE CONTAINERS

This invention relates to heat treatable containers.

With the increased use of microwave ovens, and the increased marketing and sale of microwaveable foodstuffs, including convenience foodstuffs, marketed in containers or trays from which the foodstuff when consumed is heated, there has evolved a type of plastic container or tray which is capable of withstanding the microwave radiation found in domestic microwave ovens.

Such microwaveable trays and containers are now well known and utilised extensively.

However foodstuffs cooked in a microwave and in particular foodstuff which traditionally is grilled or fried tends not to change colour during the microwaving process and the cooked food can sometimes therefore have a non-conventional appearance. It would be desireable therefore if microwaveable trays and containers containing foodstuff which is cooked by microwave energy could subsequently, with the cooked foodstuff therein, be placed for example under a conventional electric or gas grill for the grilling or browning of the footdstuff to give the cooked foodstuff a more conventional appearance. However, the plastics material which is used for microwaveable containers and trays, cannot withstand the high temperatures experienced in grilling procedures.

A tray or container of plastics material which can withstand all conventional cooking treatments and also be microwaveable clearly is a highly desireable article but plastics technology as it stands at present does not provide a plastics material which can be used for producing microwaveable containers and trays at a sufficiently economical price and which is also capable of withstanding the heat to which foodstuff is subjected when it is grilled in a domestic grilling apparatus.

In developing the present invention, a number of experiments were tried with a view to producing a container which in addition to being microwaveable was also capable of withstanding the heat treatments conventionally encountered in grilling foodstuffs but with little success until a considerably novel approach was adopted, and resulted in the present invention.

The present invention provides that a microwavable container or tray is used during grilling of the contents of the tray whilst still in the tray, with a heat reflective skirt which covers the container or tray in those areas subject to the heat radiation when the contents of the tray are grilling.

The container or tray could normally be of microwaveable plastics material but could alternatively be of cardboard folded or formed into a tray.

Typically, the skirt will cover the top edge of the tray or container and the side wall or walls thereof.

The heat reflective skirt deflect away the radiated heat from the container during grilling and enables the container to retain its integrity despite the surrounding high temperature.

The skirt is adapted to be applied to the container after, for example, the container with its contents has been placed in the microwave oven and the contents have been microwaved for the cooking of same. It is to be noted that the initial cooking of the contents may be by conventional means other than microwaving It can be seen therefore that the invention envisages the provision of a skirt positionable in relation to a container which is microwavable in order to protect that container from distorting under the radiated heat of grilling. The skirt may simply be a loose fit over the container, or it may for example be a metallic foil which is folded or crimped around the container but in either case the skirt will be constructed and designed so as to have a shape to be used in conjunction with an appropriately shaped container.

Typically, the container and its contents would probably be sold in a package, that package according to the invention would contain a loose skirt, which may be a band of aluminium foil folded to flattened condition so that it takes up little or no space in the package. When the person requiring to microwave and grill the foodstuff contents in the container wishes to use the package, he first of all places the container and its contents in the microwave (or other) oven in order to cook the contents and when the container and its contents are removed, he opens up the skirt and drops it round the containers and its contents and then folds over the top edge of the skirt to cover the top edge of the container and the resulting assembly can then be placed under the grill for the grilling of the foodstuff, the skirt serving the function of deflecting away the radiated heat from the overhead grill.

Alternatively, the package may comprise a casing in which the microwaveable container and its contents are contained, and the container may embody the skirt, the skirt resulting when portions of the container are torn away.

The invention also provides a skirt designed for use in connection with a microwaveable container or tray and which is adapted to fit around the container or tray in order to protect same from radiated energy when the container or tray contents are being grilled by for example a domestic grilling apparatus.

The skirt may take any convenient form such as the aluminim foil as described herein, or a substrate such as a cardboard strip or box, one side having a heat reflective surface defined suitably by a metallic layer or coating or by metallic film laminated to the cardboard. Alternatively the board could be a metallised board.

Embodiment of the invention will now be described, by way of example, with reference to the accompanying drawings, wherein.

Figure 1:
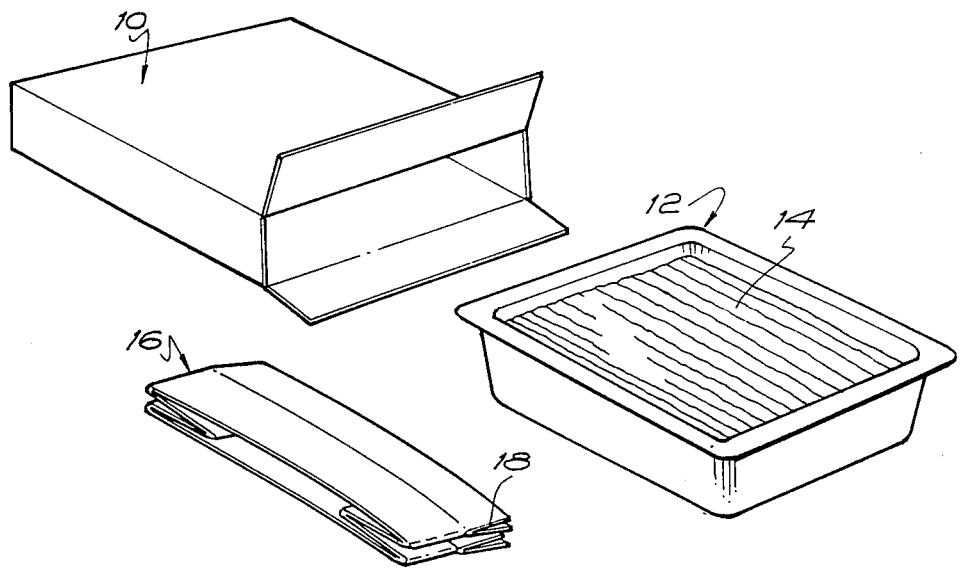
FIG. 1 is an exploded perspective view of a package according to the embodiment of the invention.
Figure 2:
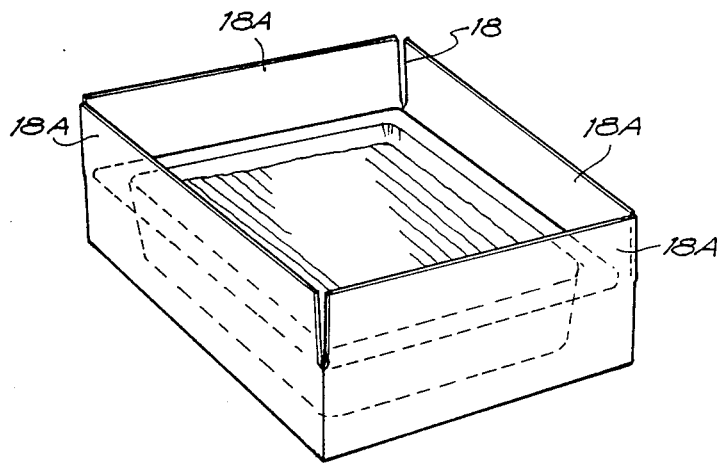
FIG. 2 shows how the plastic container of FIG. 1 is used in conjunction with the heat reflective skirt.
Figure 3:
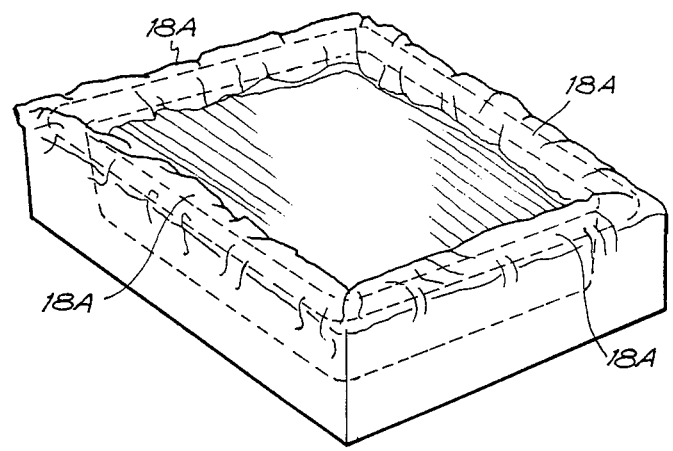
FIG. 3 shows how the heat reflective skirt is finally placed in position in relation to the plastic container prior to grilling of the container contents.

Referring to FIGS. 1 to 3 of the drawings, the package shown in FIG. 1 comprises essentially three elements, namely an outer case 10 which is of rectilinear form and suitably is constructed of cut and creased material such as cardboard or plastics sheet. The outer case 10 is for receiving in this case a thermoformed microwaveable container 12 which is in the form of a tray containing contents 14 being foodstuff which is to be cooked in the tray 12 and if appropriate eaten from the tray. The contents 14 are of a type suitable for cooking by microwave or other oven, but subsequently requiring to be grilled in order to "brown" the surface of the contents 14. The tray 12 is preferably of plastics material and may be thermoformed from PET, polypropylene or polypropylene filled with inorganic material.

The third element of the package is a skirt 16 which is a strip of aluminim foil of endless form and provided with slits 18 (which slits are optional and may be omitted) which extend part way through the width of the band for a purpose to be explained. The length of the skirt 16 is slightly greater than the length of the largest peripheral circumferential dimension of the tray 12.

In use of the package shown in the drawings, the user extracts the tray 14 and its contents and also the skirt 16 which will be contained in the case 10, the case 10 being in the sealed form when it is received by the customer.

The tray 12 will the contents 14 are then placed in a microwave so that the contents will be cooked by microwave heating in conventional fashion and then removed from the microwave oven.

Before grilling the surface of the contents 14 the user opens out the skirt 16 and places it over the tray 12 as indicated in FIG. 2 so that the slits 18 extend upwardly from the corners of the tray 12. The skirt portions 18A between the slits are then folded over as indicated in FIG. 3 so as to cover the upper flange of the tray 12. The depending portions of the skirt cover the outer surfaces of the walls of the tray 12.

Skirt 16 is of heat reflective material or has a heat reflective surface and suitably the skirt may be of aluminium or other metallic foil.

When the portions 18A are folded over to the position shown in FIG. 3, the entire assembly is ready to be placed under a grill in order to grill the tray contents. The skirt during this grilling reflects the heat away from the plastic container 12 so that the heat will not degrade the same.

Figure 4:
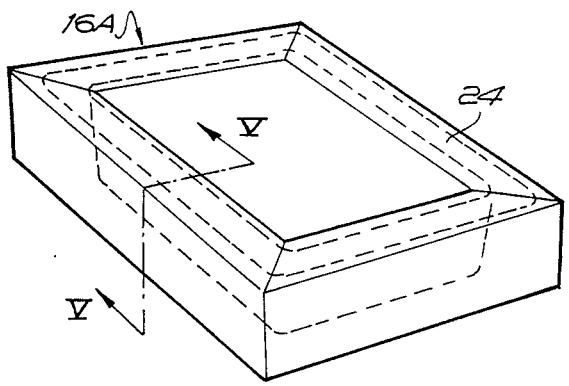
FIG. 4 is a view similar to FIG. 3, but shows an alternative to the FIG. 3 arrangement.
Figure 5:
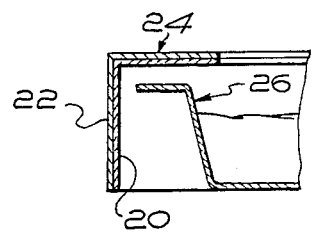
FIG. 5 is a sectional elevation of the arrangement shown in FIG. 4, the section being taken on the line V—V in FIG. 3.

In the embodiment of the invention shown in FIGS. 4 and 5, the skirt 16A is of cardboard material 20 to which is laminated metallic foil 22 which serves as the heat reflective surface. The board skirt 16 may be of cut and creased construction and simply drops over the container 12 as shown in FIG. 5. FIG. 5 also shows that the flange 24 of the skirt 16A extends sufficiently over the top flange 12A of the tray 12 so that the exposed top region 26 of the inner wall of the tray 12A of the tray 12 will be protected from the radient heat. Instead of the board being laminated with metal foil the reflective characteristics may be created by using metallised board or metallised film or metallised inks applied to the board.

The concept of the invention from the above will be readily appreciated, and it will also be readily appreciated that the skirt may take other embodiments. For example it could be embodied in the case 10, appropriate portions in the case 10 bieng removed or the skirt being torn from the case 10 and being reconstructable around the tray 12. Instead of the skirt being of the folded strip form as shown in FIG. 1, it could be semirigid or rigid component and simply drops over the tray 12 as shown in order to protect same during grilling.

The invention extends to the skirt per se, designed and dimensioned for use with a specific container 12, and also to a combination of container 12 and protective skirt, and finally to the entire package comprising outer case, container 12 with contents and protective skirt either as a separate item or embodied within the case.

I claim:

1. A package for use in microwave and/or grill cooking, comprising:
   (i) a tray for containing foodstuff, said tray including a base, a peripheral wall and a top rim, at least said top rim being made of a material which can withstand microwave cooking but which cannot withstand heat from a heating grill; and
   (ii) a heat protective component for use in conjunction with said tray, said protective component being separate from said tray, said protective component including a band of microwave reflective material having a portion placed around the entire tray peripheral wall outside of the tray and extending over a major portion of the depth of said wall and having a portion thereof crimped inwardly over the tray top rim without covering the foodstuff, to heat protect the top rim in the event that the tray and protective component are placed under the heating grill for the grilling of the foodstuff in the tray.

2. A package according to claim 1; wherein the flat band is made of a metallic foil.

3. A package according to claim 2; wherein the package comprises the tray containing foodstuff to be microwave cooked, the band of metallic foil when in flattened form and prior to being crimped to the tray and a casing containing the tray and foodstuff and said metallic band in flattened form.

4. A package according to claim 1; wherein the tray is made of a material selected from the group consisting of cardboard and plastics.

5. A package in combination with a food stuff and for use in microwave and/or grill cooking, comprising:
   (i) a tray containing said foodstuff, said tray including a base, a peripheral wall and a top rim, at least said top rim being made of a material which can withstand microwave cooking but which cannot withstand heat from a heating grill; and
   (ii) a casing in which the tray and foodstuff are held, said casing including an annular region of grill heat protective material, said casing being separate from the tray, said annular region overlying the tray trim but not the foodstuff wherein the foodstuff while in the tray can be grilled and said annular region will protect the tray rim from heat from the heating grill.

6. A package according to claim 5; wherein said casing is made of cardboard and said annular region includes a metallic foil laminated to said cardboard.

7. A package according to claim 5; wherein said tray is made of a material selected from the group consisting of cardboard and plastics.

* * * * *